United States Patent
Happonen et al.

(10) Patent No.: US 7,317,767 B2
(45) Date of Patent: Jan. 8, 2008

(54) DC OFFSET CORRECTION IN A MOBILE COMMUNICATION SYSTEM

(75) Inventors: Aki Happonen, Kiiminki (FI); Olli Piirainen, Oulu (FI)

(73) Assignee: Nokia Corporation, Espoo (FI)

( * ) Notice: Subject to any disclaimer, the term of this patent is extended or adjusted under 35 U.S.C. 154(b) by 489 days.

(21) Appl. No.: 10/490,596

(22) PCT Filed: Sep. 27, 2002

(86) PCT No.: PCT/IB02/04179

§ 371 (c)(1), (2), (4) Date: Mar. 25, 2004

(87) PCT Pub. No.: WO03/030476

PCT Pub. Date: Apr. 10, 2003

(65) Prior Publication Data

US 2004/0209573 A1  Oct. 21, 2004

(30) Foreign Application Priority Data

Sep. 27, 2001  (GB) ................................ 0123290.9

(51) Int. Cl.
*H04L 25/06* (2006.01)
(52) U.S. Cl. ........................................... 375/319
(58) Field of Classification Search ................ 375/319, 375/147, 317, 316, 318
See application file for complete search history.

(56) References Cited

U.S. PATENT DOCUMENTS 5,684,827 A * 11/1997 Nielsen ..................... 375/232
5,748,677 A * 5/1998 Kumar ....................... 375/285
6,148,047 A * 11/2000 Mohindra ................... 375/346

FOREIGN PATENT DOCUMENTS

| DE | 196 06 102 A1 | 8/1997 |
| WO | WO 9825351 A2 * | 6/1998 |
| WO | WO 00/69023 | 11/2000 |
| WO | WO 01/03397 A1 | 1/2001 |
| WO | WO 01/22571 A1 | 3/2001 |
| WO | WO 01/31867 A1 | 5/2001 |

OTHER PUBLICATIONS

Lindoff, "Using a Direct Conversion Receiver in EDGE Terminals-a new DC Offset Compensation Algorithm", IEEE International Symposium on Personal Indoor and Mobile Radio Communications, Sep. 18-21, 2000, pp. 959-963, XP002198497.

(Continued)

*Primary Examiner*—Khai Tran
(74) *Attorney, Agent, or Firm*—Squire, Sanders & Dempsey, L.L.P.

(57) ABSTRACT

A method of simultaneously determining a DC offset and a channel impulse response from a received signal in a mobile communication system. The received signal comprising a set of training sequence bits that have been modulated prior to transmission. The modulated signals experience a certain phase shift and are rotated by a certain angle. The received signal may also comprise a DC offset component that needs to be removed By manipulation of the received signal samples with the knowledge of the original training sequence and method of modulation used, it is possible to simultaneously estimate the communication channel's impulse response and the DC offset by finding the Least Squares solution to a linear equation, such that the energy of the noise term introduced into the communication channel may be kept to a minimum. An improved technique utilising a priori information is also described.

27 Claims, 5 Drawing Sheets

OTHER PUBLICATIONS

Lyon, "Elimination of DC Offset by MMSE Adaptive Equalisers", IEEE Transactions on Communications, vol. 24, No. 9, Sep. 1976, pp. 1049-1054, XP000758814.

Baltersee et al, "Linear MMSE Channel Estimation for GSM", IEEE Global Telecommunications Conference, Dec. 5-9, 1999, pp. 2523-2527, XP000958575.

* cited by examiner

$$X = \begin{bmatrix} X_{11} & X_{12} & \cdot & \cdot & \cdot & X_{1m} \\ X_{21} & \cdot & \cdot & \cdot & \cdot & X_{2m} \\ \cdot & \cdot & \cdot & \cdot & \cdot & \cdot \\ \cdot & \cdot & \cdot & \cdot & \cdot & \cdot \\ \cdot & \cdot & \cdot & \cdot & \cdot & \cdot \\ \cdot & \cdot & \cdot & \cdot & \cdot & \cdot \\ X_{n1} & \cdot & \cdot & \cdot & \cdot & X_{nm} \end{bmatrix}$$

n rows, m columns $$X_e = \begin{bmatrix} X_{11} & \cdot & \cdot & \cdot & \cdot & \cdot & X_{1m} & e_{1(m+1)} \\ \cdot & \cdot & \cdot & \cdot & \cdot & \cdot & \cdot & e_{2(m+1)} \\ \cdot & \cdot & \cdot & \cdot & \cdot & \cdot & \cdot & \cdot \\ \cdot & \cdot & \cdot & \cdot & \cdot & \cdot & \cdot & \cdot \\ \cdot & \cdot & \cdot & \cdot & \cdot & \cdot & \cdot & \cdot \\ \cdot & \cdot & \cdot & \cdot & \cdot & \cdot & \cdot & \cdot \\ X_{n1} & \cdot & \cdot & \cdot & \cdot & \cdot & W_{nm} & e_{n(m+1)} \end{bmatrix}$$

n rows, m+1 columns

FIG. 4(a)

$$h = \begin{bmatrix} h_1 \\ h_2 \\ \cdot \\ \cdot \\ \cdot \\ \cdot \\ h_m \end{bmatrix}$$

m rows

DC OFFSET CORRECTION IN A MOBILE COMMUNICATION SYSTEM

BACKGROUND OF THE INVENTION (1) Field of the Invention

The present invention relates particularly to DC offset correction in a mobile communication system.

(2) Description of the Related Art

In a mobile communication system, signals are transmitted from mobile stations to a base station. A digital signal is prepared for transmission by the mobile station by subjecting it to a modulation technique and using the resulting signal to modulate a carrier wave at a certain frequency. In transmission of the signal from a mobile station to the base station, it may be subject to a number of different effects, depending on the environment through which the signal passes. That environment can vary considerably, depending, amongst other things, on the distance between the mobile station and the base station, and the interference caused by buildings and other structures in the area. It is quite common for a signal received from a mobile station at the base station to comprise a number of different multi-path effects and also to be subject to noise. Processing techniques at the receiver in the base station are known to resolve the effects of the environment through which the signal passes (communication channel) and also to take into account the effects of noise. The first step at the receiver is to sample the incoming signal to take a number of digital samples from the incoming analogue signal, normally sampled at the expected bit rate of the transmitted signal. This can give rise to a DC offset component which, if not removed, could corrupt the received signal samples such that the subsequent processing would be affected. In particular, the digital signal samples may be processed by an equaliser to compensate for the effects of the channel, and the known equalisers do not assume that a DC offset will be present. There are other sources that may introduce a DC offset and the magnitude of the DC offset may vary. It is an aim of the present invention to obtain a reliable estimate of the offset magnitude that needs to be removed from the signal, without degrading the performance too much in the case that in fact no DC offset has been introduced.

In current base stations, a possible DC component is removed from the received signal by digital signal processing means. This is performed by removing the mean signal level from the real and imaginary component separately. Thus, the received signal y is considered to comprise both a real component and an imaginary component which are handled separately. A mean value (Ey) can be calculated over a whole burst to improve reliability. However, the transmitted data itself can cause the average value to have a false mean value, even in the case where there is no actual DC offset. This clearly degrades the performance of the subsequent digital signal processing.

According to one aspect of the present invention there is provided a method of simultaneously determining a DC offset ($a_{dc}$) and a channel impulse response (h) for a signal received from a first station by a second station via a communication channel in a mobile communication system, the signal comprising digital data and a set of training sequence bits modulated prior to transmission, the method comprising: generating a set of reference signal samples representing the training sequence bits and a set of rotation elements depending on the modulation applied to the digital data prior to transmission; receiving and sampling the signal to produce a plurality of received signal samples from the training sequence portion of the signal, the received signal samples possibly including a DC offset; and manipulating the received signal samples with the sets of received signal samples and rotation elements in such a way as to simultaneously estimate the DC offset ($a_{dc}$) and the channel impulse response (h) by minimising a squared distance function.

According to another aspect of the invention there is provided a method of correcting for a DC offset in a signal received from a first station by a second station via a communication channel in a mobile communication system, the signal comprising digital data and a set of training sequence bits modulated prior to transmission, the method comprising: receiving and sampling the signal to produce a plurality of received signal samples from the training sequence portion of the signal, the received signal samples possibly including a DC offset; manipulating the received signal samples with a set of reference signal samples representing the training sequence bits and a set of rotation elements depending on the modulation applied to the digital data prior to transmission to simultaneously estimate the DC offset ($a_{dc}$) and the channel impulse response (h) by minimising a squared distance function; and correcting the set of received signal samples in the digital data portion of the signal by removing the thus estimated DC offset from the received signal samples.

Preferably the squared distance function is $F=|y-X.h-e.a_{dc}|^2$, where y represents the received signal samples, X represents the training sequence samples and e represents the set of rotation elements According to a further aspect of the invention there is provided a system for simultaneously determining a DC offset and a channel impulse response in a signal received from a first station by a second station via a communication channel in a mobile communication system, the signal comprising digital data and a set of training sequence bits modulated prior to transmission, the method comprising: circuitry for receiving and sampling the signal to produce a plurality of received signal samples from the training sequence portion of the signal, the received signal samples possibly including a DC offset; a memory holding a set of reference signal samples representing the training sequence bits and a set of rotation elements depending on the modulation applied to the digital data prior to transmission; an extended channel impulse response calculation unit for manipulating the received signal samples with the reference signal samples and the set of rotation elements in such a way as to simultaneously estimate the DC offset ($a_{dc}$) and the channel impulse response (h) by minimising a squared distance function; and means for extracting the DC offset from the simultaneous estimate performed by the extended channel impulse response calculation unit.

The squared distance function is preferably $F=|y-X.h|e.a_{dc}|^2$, where y represents the received signal samples, X represents the training sequence samples and e represents the set of rotation elements.

A mathematically convenient way of manipulating the samples is to organise the received signal samples and the rotation elements as an extended training sequence matrix with m+1 columns, where m columns contain the reference signal samples and the m+1$^{th}$ column contains the rotation elements.

The precise manipulation of the received signal samples with the extended reference matrix is discussed in more detail in the following. The inventor has found that by using this extended matrix in a mathematical manipulation, which minimises the noise function w, an estimate can be made simultaneously of the channel impulse response and the DC offset, which can then be removed. For a matrix manipulation, an extended channel impulse vector is generated comprising m channel impulse response elements and a further element $a_{dc}$.

The invention is particularly but not exclusively applicable to a TDMA communication system, where each signal comprises a transmission burst.

BRIEF DESCRIPTION OF THE DRAWINGS

The system described herein also includes an equaliser which uses the channel impulse elements extracted from the extended channel impulse vector to account for effects of the communication channel. It will readily be appreciated that after equalisation the data is subject to a number of subsequent processing steps in order to extract the original data in the burst. These are not described herein because they are known to a person skilled in the art and do not form part of the present invention.

For a better understanding of the present invention and to show how the same may be carried into effect, reference will now be made by way of example to the accompanying drawings in which:

FIGS. 4a and 4b are diagrams that show the construction of the extended training sequence matrix and the extended impulse response vector, respectively;

DETAILED DESCRIPTION OF THE
PREFERRED EMBODIMENTS

Figure 1:
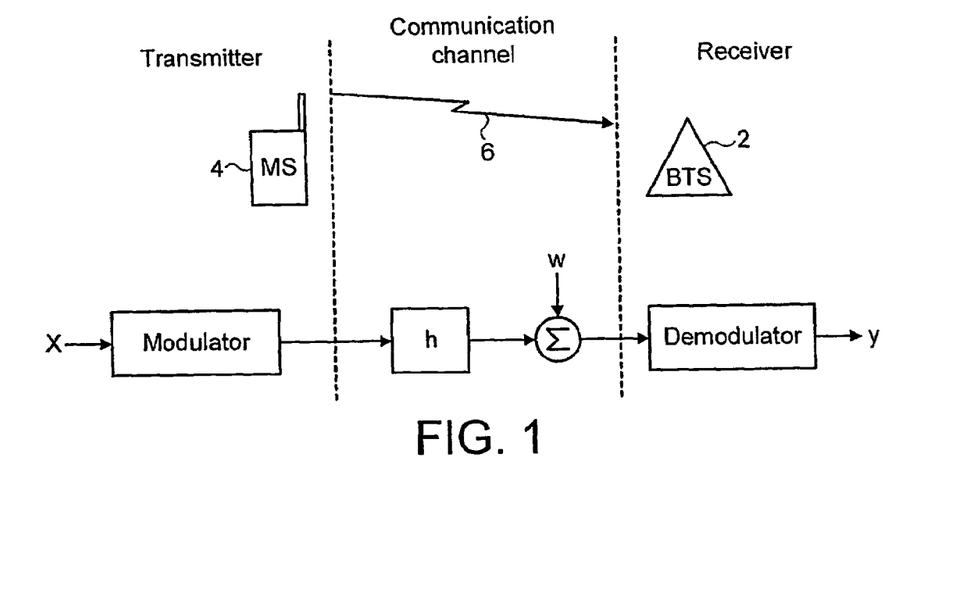
FIG. 1 is a diagram of a model of the transmission system.

FIG. 1 is a diagram illustrating a model of a typical digital transmission system. It is shown together with an actual implementation of a cellular radio frequency (RF) communication system which is mapped to the model. The radio communication system comprises a base state BTS 2 and at least one mobile station MS 4 in communication with each other via a communication channel over an air interface. In the following description, the mobile station is considered to be the transmitter and the base transceiver station is considered to be the receiver. Reference numeral 6 denotes the transmission signal being conveyed by the mobile station 4 to the base transceiver station 2. It will readily be appreciated however that the system and techniques described in the following are equally applicable where the base transceiver station 2 is acting as the transmitter and a mobile station MS 4 is acting as the receiver.

For the purposes of the following description, the transmitter is considered to comprise a modulator which applies the necessary modulation to the signal so that it can be transmitted over the communication channel. The communication channel itself can be modeled as a channel impulse response h and a noise component w that may be typically introduced as a result of some external perturbation to the system. The receiver side is considered to comprise a demodulator which carries out the necessary demodulation functions so that the originally transmitted information can be recovered from the received signal. Thus, according to the model of FIG. 1 the modulator is considered as carrying out a modulation process and the demodulator is considered as carrying out a demodulation process. The assumption is made herein that it is necessary to apply a modulation to the signal prior to transmission, and thus to carry out an according demodulation process on receipt of the signal. In FIG. 1, X is used to denote the signal prior to modulation and y is used to denote the recovered received signal after demodulation.

Figure 2:
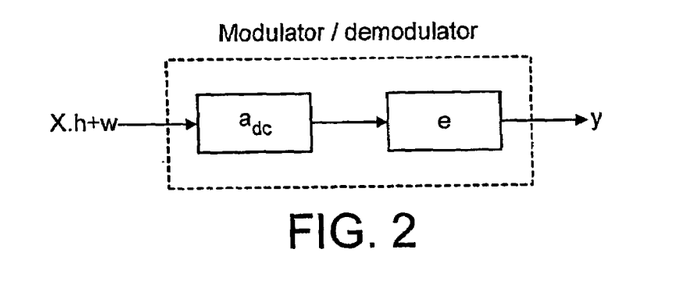
FIG. 2 is a further diagram of a model of the system.

For the purpose of the present description, the modulation and demodulation process can be thought of as introducing two components. These components are a DC offset ($a_{dc}$) and a phase shift vector (e) which may be modeled as shown in FIG. 2. That is, the received signal y differs from the channel-equalised version of the input signal x by $a_{dc}$ and e. The magnitude of the DC offset ($a_{dc}$) is unknown and causes problems with subsequent DSP techniques on the received signal if it is not removed. The phase shift vector (e) depends on the modulation method used, and thus is known. EDGE (Enhanced Data Rates for GSM Evolution) modulation is an example. For EDGE the selected modulation is 3 pi/8-8 PSK. In the basic 8 PSK constellation there are 8 equidistant points on the unit circle. This means that the transmitted symbols $x_k$ can have eight possible values, $x_k = e^{j*i*pi/4}$, where i can have values from 0 to 7 depending on the symbol value (j is complex indicator).

Now for 3 pi/8-8 PSK, the 3*pi/8 shift means that the transmitted symbols are multiplied by a 3 pi/8 rotating value. So, $x_k' = x_k * e^{j*k*3*pi/8}$, where k is the symbol index.

This means that in the receiver the transmitted samples ($x_k'$) must be derotated by $e^{-j*k*3*pi/8}$ to get the original 8PSK constellation ($x_k$) to be equalised. This derotation will also make the DC offset rotate by $e^{-j*k*3*pi/8}$.

Figure 3:
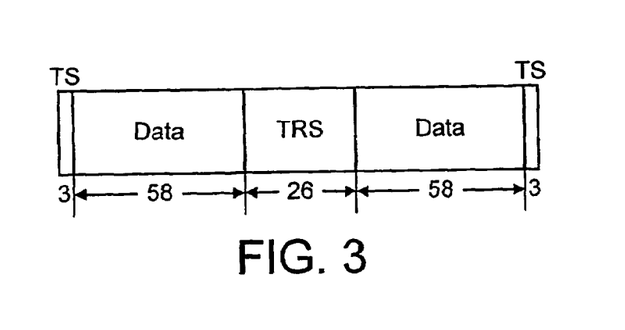
FIG. 3 is a diagram that represents the standard structure of a signal burst in a mobile communication system.

FIG. 3 illustrates a normal burst in a mobile communication system according to the GSM standard. This figure represents a burst received at a base station. For a TDMA system according to the GSM standard, mobile stations transmit bursts as modulated signals on respective carrier frequencies according to channels allocated to respective calls by a base station controller. One frequency channel may support up to eight calls, each call being associated with a respective burst, where each call is allocated a time slot in a TDMA frame in which to send the burst. Further details of a TDMA system according to the GSM standard are not described herein because they are known to a person skilled in the art. The normal burst contains two packets of 58 bits (DATA) surrounding a training sequence (TRS) of 26 bits. Three tail bits (TS) are added to each end of the normal burst. The training sequence (TRS) is a predetermined sequence of bits which are sent by the mobile station (MS) and is known at the base station controller (BSC). It is normally utilised at the base station controller to estimate the impulse response of the channel over which the burst is sent. According to the system described in the following, it is used to jointly calculate the impulse response and the DC offset. The actual information which is transmitted is located in the data bits (DATA) of the burst.

Thus, the technique described in the following is based on the joint estimation of the channel impulse response and DC offset using the training sequence TRS. X is used in the following to denote the training sequence because as far as the model of FIG. 1 is concerned, that is the input signal of interest for the following mathematical explanation. Before describing the system, an explanation of the mathematical techniques which are used in the system is set out.

The linear equation based on the models illustrated in FIGS. 1 and 2 is formally stated in Equation 1.

$$y = X.h + e.a_{dc} + w \quad \text{(Equation 1)}$$

Each digital sample of the signal is modulated prior to transmission and therefore experiences a phase shift depending on the modulation technique used. This phase shift is also known as rotation and may be represented as: $e^{-j\theta}$. Therefore a vector (e) may be formed which comprises the phase shifts of all the samples of the training sequence that are used as in Equation 2.

$$e = [e^{-j.k.\theta} e^{-j.(k-1).\theta} \ldots e^{-j.(k-n+1).\theta}]^T \quad \text{(Equation 2)}$$

where:
- θ—represents the phase shift (and depends on the method of modulation that is implemented).
- k—represents the time indexes (indices) of the samples taken of the training sequence.
- n—represents the number of samples used in the training sequence.

For example, if GMSK modulation is used, the samples are all rotated by 90 degrees (θ=π/2). Therefore, these samples will need to be derotated before the received signal is equalised.

Equation 4 can now be formulated by creating an extended training sequence matrix ($X_e$) and an extended impulse response vector ($h_e$) incorporating the phase shift vector (e) and the DC offset ($a_{dc}$) elements into the aforementioned matrix (X) and vector (h) as shown by Equation 3:

$$X_e = [X \ e] \text{ and } h_e = \begin{bmatrix} h \\ a_{dc} \end{bmatrix} \quad \text{(Equation 3)}$$

$$y = X_e h_e + w \quad \text{(Equation 4)}$$

FIG. 4a illustrates the original training sequence and extended training sequence matrices. FIG. 4b illustrates the original impulse response and the extended impulse response vectors, where:
- m—represents the amount of impulse response taps (i.e. i=0 . . . 4)
- n—represents the length of samples used for impulse response estimation (i.e. k=26).

FIG. 4a illustrates that the matrix size is determined by the number of columns and rows that constitute the matrix. It is important to note that the original training sequence matrix (X) is composed of known elements. The number of columns m corresponds to the number of discrete taps that the proposed model of the impulse response filter will possess. The number of rows n is determined by the length of samples used from the training sequence for impulse response estimation. This makes the matrix size and the computational power required by the DSP flexible depending on the user's specification. The extended training sequence matrix ($X_e$) is created by adding an additional column of elements to the known training sequence matrix (X). This additional column contains the elements of the phase shift vector (e) (also known) and the size of the extended training sequence matrix is now m+1 columns by n rows.

FIG. 4b shows the original and extended impulse response vectors ($h/h_e$). The extended impulse response vector has m+1 elements which means it can readily be manipulated with the m+1 columns provided by the extended training sequence matrix ($X_e$). The last element in the impulse response vector is the DC offset term ($a_{dc}$).

The extended impulse response vector $h_e$ can be found by ensuring that adequate estimates for the channel impulse response and DC offset can be made by minimising the function $F = |y - X.h - e.a_{dc}|^2$, where F represents the Least Squares solution to minimise the noise (w). Using the matrix format, Equation 5 results.

$$h_e = (X_e^H . X_e)^{-1} . X_e^H . y \quad \text{(Equation 5)}$$

where; y represents the received signal, and
- $X_e^H$ represents the complex conjugate transpose of the extended matrix.

Thus, this has effectively solved for the required number of channel impulse response elements and also for the DC offset term ($a_{dc}$).

Figure 5:
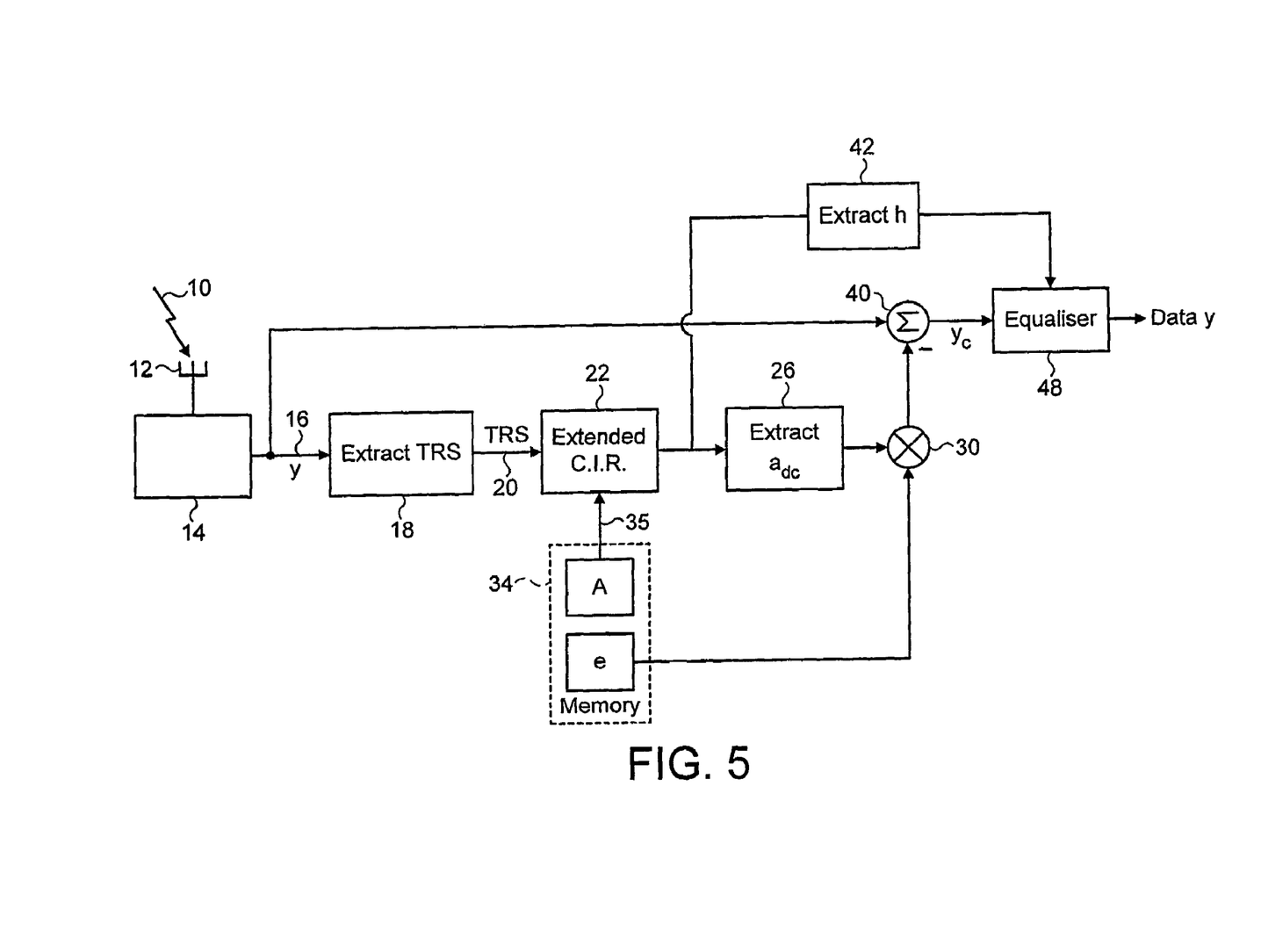
FIG. 5 is a block diagram of a receiver.

A block diagram for implementing the technique will now be illustrated in FIG. 5.

It should be understood that the various blocks in FIG. 5, although illustrated as separate interconnected entities, do not necessarily represent separate physical entities, but are intended to represent diagrammatically the various steps which are carried out. The blocks could be implemented as circuits or a suitably programmed microprocessor may effect each of the functions which is individually assigned to the blocks. Moreover, a receiver for a BTS or MS will have a number of components which are not illustrated in FIG. 5 and which have been omitted for the sake of clarity and because they do not pertain to the present invention. An antenna 12 receives the transmitted signal 10 via the air interface from the mobile stations. The antenna 12 is connected to RF circuitry 14. The RF circuitry 14 operates on the received burst to downshift the frequency to the baseband frequency and to sample the burst to provide from the analogue input signal digital sampled values. The output of RF circuitry 14 is denoted y and is a sampled burst comprising a plurality of signal samples $y_i$, sampled at the expected bit rate of the transmitted signal. As described above, FIG. 3 illustrates the burst construction. The output of the RF circuitry 14 is supplied along line 16 to a TRS extractor 18 and also to a subtraction circuit 40 the purpose of which will be described later.

The training sequence TRS is extracted from the received signal y and supplied along line 20 to an extended channel impulse response unit 22. It will be appreciated that TRS is represented at this point as k (k=26 in this embodiment) digital signal samples.

The extended channel impulse response unit 22 is used to calculate the so-called extended channel impulse response he which includes not only the "normal" channel impulse response taps $h(i)_{i=0 \ldots 4}$ but also the required DC offset value $a_{dc}$. In known receivers, the channel impulse response unit uses the received training sequence TRS and calculates an estimated channel impulse response h by calculating the cross correlation between the received training sequence TRS and the known training sequence which is stored at the receiver, TRSref. In the present case, somewhat different calculations are performed according to the mathematical concepts described earlier. It will be appreciated that the extended CIR unit 22 comprises a suitably programmed processor for implementing the calculation. The extended channel impulse response unit 22 has access to a memory 34 in which there is prestored at least one so-called A matrix. The A matrix is calculated by manipulating the transpose of the complex conjugate of the extended training sequence matrix $X_e^H$ as defined in Equation 6. The formation of the extended training sequence matrix $X_e$ has been described and is illustrated in FIG. 4a.

$$A=(X_e^H.X_e)^{-1}.X_e^H \qquad \text{(Equation 6)}$$

It will be readily understood that the diagrammatic layout of the memory 34 is for illustration purposes only and the use of the storage capacity can be in any appropriate manner. Moreover, a number of different A matrices can be precalculated and stored to take into account different phase shift vectors (e) and different training sequences. The extended CIR unit 22 can select the appropriate A matrix. The memory 34 also holds the phase shift vector (e) for a purpose which will be described later.

Therefore, the extended channel impulse response unit 22 has two inputs. One input is the training sequence TRS of the received signal and the other is the calculated A matrix. The extended CIR unit (22) calculates the extended channel impulse response vector $h_e$ using Equation 5 (noting the value of A in Equation 6). The matrix manipulations (based on the Least Squares minimisation of the noise function F) allow the impulse response h and DC offset $a_{dc}$ values to be solved by performing only one matrix multiplication, i.e. ($h_e$=A.y).

A DC offset extract unit 26 extracts the DC offset $a_{dc}$ from $h_e$ and supplies it to a multiplier circuit (30). The other input to the multiplier circuit is the known phase shift vector e stored in a portion of memory. If the modulation method used resulted in no rotation of the samples, then this vector would comprise a set of ones. In either event, the phase shift vector (e) is multiplied with the DC offset ($a_{dc}$). The product $a_{dc}$.e is then subtracted from the received signal y at the subtraction circuit (40). The output is a corrected signal $y_c$ that is fed to an equaliser (48). The equaliser (48) also receives the normal channel impulse response h extracted from the extended channel impulse response vector $h_e$ by an extract h circuit (42). The equaliser is known in the art and allows the data DATA y in the burst to be recovered.

In brief, the equaliser, as the name suggests, is a filter used to negate the effects of the communication channel (such as time dispersion, fading, etc.). The calculation of the impulse response vector allows an equalising filter to be constructed modelled on the inverse of the impulse response taps calculated and reflected in the elements of the first m rows of the matrix shown in FIG. 4b.

Figure 6:
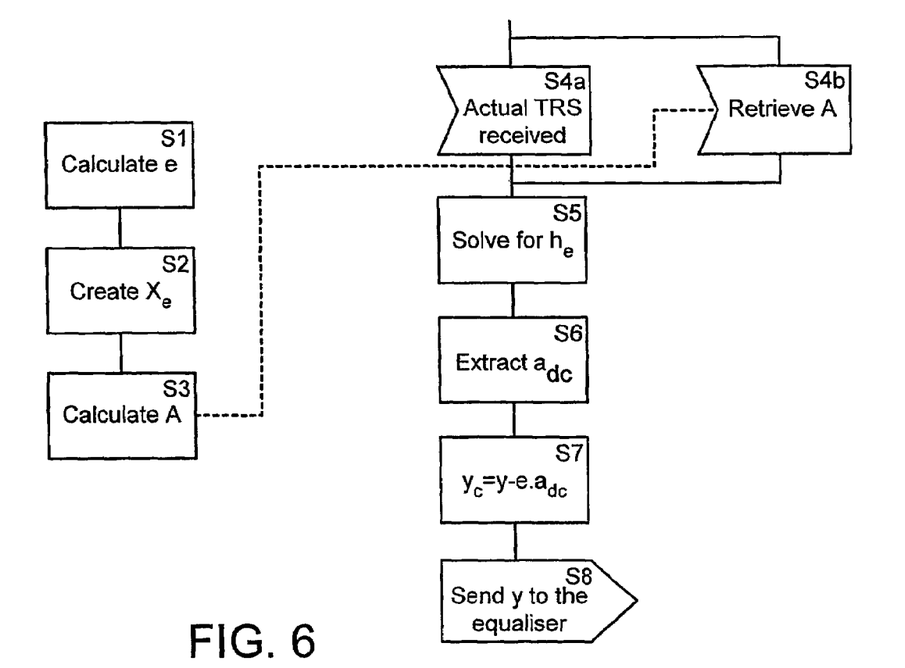
FIG. 6 is a flow diagram illustrating the method of the DC offset value removal.

FIG. 6 is a flow diagram which describes the processing sequence as two parts. The first part (S1 to S3) can be done prior to receipt of a signal as part of a set up procedure. The second part is accomplished in the circuitry of FIG. 5. The first step S1 is to calculate the phase shift vector (e), based on the known modulation technique. Next, at S2, the extended training sequence matrix ($X_e$) is created. It is assumed that the training sequence matrix X is already known. The phase shift vector is added as a final column of this matrix resulting in the extended matrix ($X_e$=[X e]).

The final processing operation S3 performed in the set up phase is to calculate the new matrix A given by Equation 6. In operation, the extended CIR unit 5 receives two input signals. The first input S4a is the training sequence portion TRS of the received signal. The second input S4b is the A matrix. The extended impulse response vector ($h_e$) may be calculated at S5 from Equation 5, and contains an additional element over the normal h taps, i.e. the DC offset ($a_{dc}$). Next at S6, the DC offset element $a_{dc}$ is extracted from the extended CIR vector he. Finally at step S7, Equation7 is used to obtain the corrected signal that is sent to the equaliser circuit.

$$y_c = y - e.a_{dc} \qquad \text{(Equation 7)}$$

This takes into account whether the samples have been derotated or not. If there is no derotation the e vector is a vector of ones. The correct signal is sent (step S8) to the equaliser after removal of the corresponding DC offset components.

It should be noted that FIG. 1 and Equation 1 are defined as a model of the transmission system and therefore it is assumed that a noise component (w) will be present. However, Equation 5 is known as the LS (Least Squares) solution to a linear equation (i.e. Equation 1). This implies that the estimated parameters, h and $a_{dc}$ are chosen so that the energy of the noise term (w) is kept to a minimum.

Figure 7:
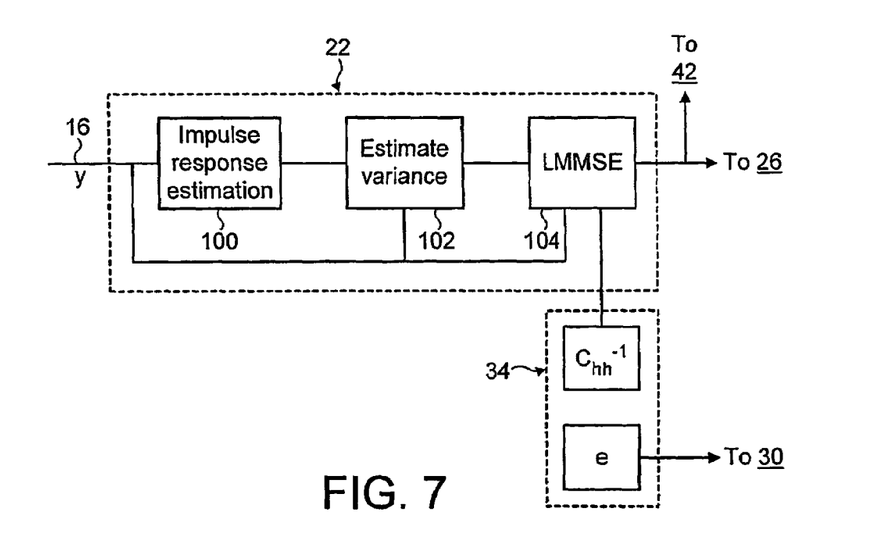
FIG. 7 is a block diagram of a further improved receiver.

A further improvement in the inventive technique proposed above is now described with reference to FIG. 7. The inventive technique described hereinabove results in an increased cost in the estimation due to an increase in noise caused by the number of parameters being increased. In the further improvement to the invention described hereafter, it is proposed to minimize the cost of the estimation by taking into account a priori information. Before describing the improved system, an explanation of the mathematical techniques which are utilized in the improved system is set out.

As described hereinabove, the offset can be selected according to the modulation used. This is formulated, from equations 3 and 4, as:

$$y = X_e h_e + w, \quad \text{where } X_e = (X \ e) \text{ and } h_e = \begin{pmatrix} h \\ a_{dc} \end{pmatrix},$$

The extended impulse response vector can be estimated using a known LMMSE estimator, which can be written as:

$$h_e = E(h_e) + (C_{hh}^{-1} + X_e^H C_w^{-1} X_e)^{-1} X_e^H C_w^{-1} (y - X_e E(h_e)),$$
where $C_w$ is noise covariance matrix and
$C_{hh}$ is estimated parameter covariance matrix The DC offset can simply be removed before sample derotation as $y=y-a_{dc}$ and after derotation as $y=y-ea_{dc}$ This format cannot be used straight away as the noise covariance matrix and the impulse response and DC-offset covariance matrices are unknown. In order to be able to use the proposed LMMSE estimator it is necessary to make certain a priori assumptions.

First it is assumed that $E(h_e)=0$. As the received signal phase is unknown, the expected value goes to zero. Also the expected DC-offset is zero. It is assumed that the DC-offset can have a random phase and therefore the expected value is zero.

The second assumption can be made for the noise covariance matrix. In this context the noise is assumed to be white, so the noise co-variance matrix can be written as:

$$C_w = \begin{pmatrix} \delta^2 & 0 & \ldots & 0 \\ 0 & \delta^2 & \ldots & 0 \\ \ldots & \ldots & \ldots & \ldots \\ 0 & 0 & 0 & \delta^2 \end{pmatrix},$$

where $\delta^2$ is the noise variance of the starting point linear model.

The third assumption is that separate impulse response taps are uncorrelated. Therefore the parameter covariance matrix can be written as:

$$C_{hh} = \begin{pmatrix} h_0^* h_0 & 0 & \ldots & \ldots & 0 \\ 0 & h_1^* h_1 & 0 & \ldots & 0 \\ \ldots & \ldots & \ldots & \ldots & \ldots \\ \ldots & \ldots & \ldots & h_i^* h_i & \ldots \\ 0 & 0 & \ldots & \ldots & dc^* dc \end{pmatrix}$$

Where $h_i$ refers to impulse response tap i and dc refers to DC-offset.

Using these assumptions the LMMSE estimator can be simplified and it can be rewritten as:

$$h_e = (\delta^2 C_{hh}^{-1} + X_e^H X_e)^{-1} X_e^H y, \text{ where}$$

$$C_{hh}^{-1} = \begin{pmatrix} 1/h_0^* h_0 & 0 & \ldots & \ldots & 0 \\ 0 & 1/h_1^* h_1 & 0 & \ldots & 0 \\ \ldots & \ldots & \ldots & \ldots & \ldots \\ \ldots & \ldots & \ldots & 1/h_i^* h_i & \ldots \\ 0 & 0 & \ldots & \ldots & 1/dc^* dc \end{pmatrix}$$

It can be noted that if the variance $\delta^2 \to 0$ the estimator comes back to classical LSE and if the autocorrelation properties of the training sequence are properly chosen the estimator comes back to basic correlation method.

In the proposed extended impulse response vector there are two unknown parameters $C_{hh}$ and $\delta^2$ still required for the DC-offset estimation. There are several possibilities to gain this information. One simple approach is to optimise the equation for particular C/(I+N) value and use a fixed value for variance estimate. The $C_{hh}$ could be a fixed matrix according to known a priori information regarding the impulse response.

In the present invention, the a priori information is used for shortening the LMMSE equation as described in the preceding paragraphs.

When the above-defined shortened LMMSE equation is used, there may be a priori information about the channel or the dc offset. So, for example, it may be known that the DC offset does not exist in certain channels (for certain carrier frequencies). Such information may be used in the DC offset estimator without needing to estimate the parameters from received data. Thus in such a scenario there is a priori information available relating to the estimated parameters.

Such information about the DC offset could be measured from previous and/or current time-slots. The LMMSE equation may then utilize this information. The utilisation of this information by the LMMSE is not actually a usage of a priori information, because such information is created by the estimator itself.

A further practical approach is based on two-phase channel estimation and is now described with reference to FIG. 7. As can be seen from FIG. 7, the extended CIR block 22 of FIG. 5 is replaced, in the preferred embodiment of FIG. 7, by three blocks: an impulse response estimation block 100, an estimate variance block 102 and an LMMSE block 104. The memory is provided with the e values as in FIG. 5. The A values are not utilized, but in one embodiment are preferably replaced by the matrix $C_{hh}$.

The impulse response estimation 100 operates to provide an initial impulse response which in one embodiment is used to provide the values of the matrix $C_{hh}$. The variance is estimated in block 102 based on the output of the block 100. It should be noted that the use of the estimate variance block 102 is optional. In this embodiment the output of the impulse response estimation block 100 is used by the LMMSE, in accordance with the theory set out above, as a priori information for estimating the impulse response in accordance with the improved technique. In such an embodiment the values $C_{hh}$ are not stored in the memory 34, as they are generated by the impulse response estimation 100.

In a further embodiment, the impulse response estimation block 100 is not provided, and the values of the matrix $C_{hh}$ are stored in the memory 34. The stored matrix $C_{hh}$ provides the a priori information to the LMMSE 104.

The output of the LMMSE is further processed in blocks 26 and 42 in the identical manner to the outputs of the block 22 in FIG. 5.

It should be noted that the estimate variance block 102 does not form an essential part of this improvement to the invention. The estimate variance block 102 may be similarly provided at the input to the block 22 in FIG. 5. In FIG. 5, it is assumed that the functionality of the estimate variance block is provided in the equalizer 48.

The important aspect of this improvement to the present invention is that a priori information is used in determining the impulse response with the dc offset removed. This a priorii information may be provided in a number of ways. In the two example implementations described herein the a priori information is provided either by carrying out an initial impulse response estimation, or by pre-storing appropriate values. Where appropriate values are pre-stored, they may be generated based on simulation.

Thus in the preferred embodiment described with reference to FIG. 7, a preliminary DC-offset and impulse response are first estimated using a classical estimator (for example an LSE) in block 100. This DC-offset is subtracted from received samples and the impulse response estimate is then used to estimate the signal variance in block 102. This variance is then used in second phase in the improved impulse response estimation method in block 104. An estimate of the $C_{hh}$ is required for the improved method, and this can be preferably achieved by for example estimating the covariance matrix $C_{hh}$ from the preliminary impulse response estimate.

As a sub-optimum method the following formula can be derived also for DC-offset correction. The weight coefficient is extended by the DC-offset estimator $$a_{ei} = \frac{|h_{ei}|^2}{|h_{ei}|^2 + e_i^* e_i}$$

The $e_i^* e_i$ is dependant on the receiver signal variance by a constant (it can be easily analysed) and the above can be written:

$$a_{ei} = \frac{|h_{ei}|^2}{|h_{ei}|^2 + p\delta^2}, \text{ where}$$

p is user selectable constant and $\delta^2$ is received signal variance

The improved technique requires handling of matrices, which increases the complexity of the DC-offset estimation.

However the DC-offset estimation will be obtained at the same time that the channel impulse response is estimated, so the total complexity does not increase significantly. Most of the matrixes are diagonal and the amount of required calculations can therefore be kept small.

Considering this improved technique for a GSM system requires 6×6 matrix inversion. Therefore the improved technique is implementable. According to simulation results achieved the improved technique is able to improve the receiver performance in all GSM 5.05 channel types as well as in different C/(I+N) situations. The first simulations have been performed with receiver without diversity using the double correlation method. The achieved gain over that receiver is significant.

Figure 8:
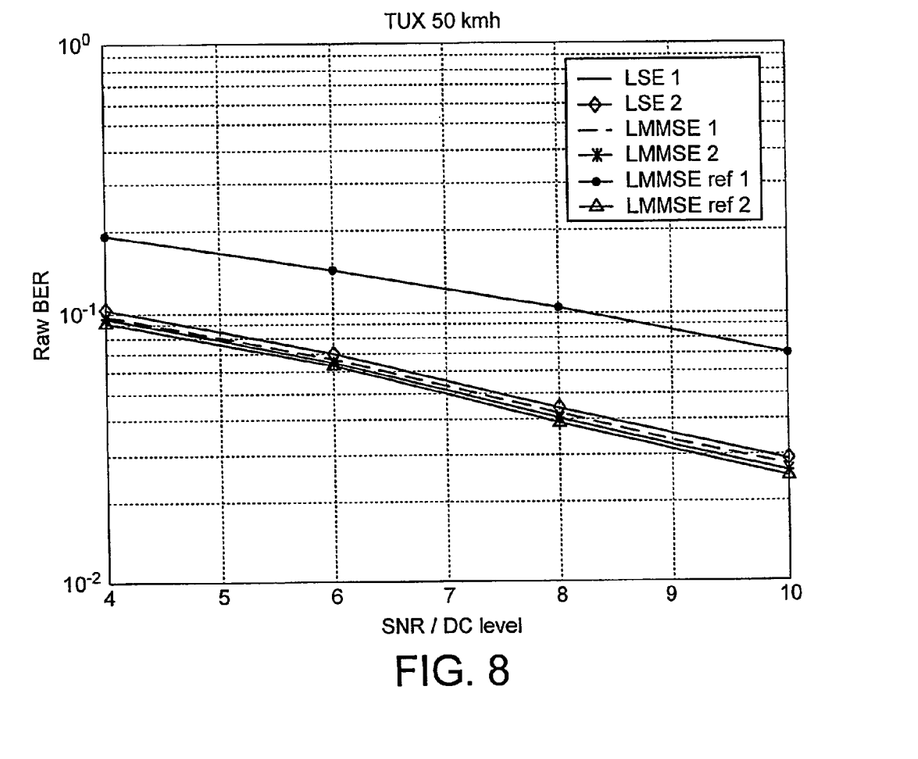
FIG. 8 illustrates the performance improvements achieved using the receiver of FIG. 7.

FIG. 8 shows one simulation. The reference for DC-offset estimator is LSE based estimator and LMMSE based estimator is reference for performance. LSE 1 is LSE estimator in the case that a DC-offset exists, and the estimated DC-offset is removed. LSE 2 is LSE estimator in the case that no DC-offset exists, and the estimated DC-offset is removed. LMMSE 1 is a proposed improved method based LMMSE estimator in the case that DC-offset exists and the estimated DC-offset is removed. LMMSE 2 is proposed improved method based LMMSE estimator in the case that no DC-offset exists and the estimated DC-offset is removed. LMMSE ref 1 is LMMSE estimator in the case that DC-offset exists and the DC-offset is not estimated and not removed. LMMSE ref 2 is LMMSE estimator in the case that no DC-offset exists and the DC-offset is not estimated and not removed.

The invention claimed is:

1. A method of simultaneously determining a DC offset ($a_{dc}$) and a channel impulse response (h), the method comprising:
   receiving a signal from a first station by a second station via a communication channel in a mobile communication system, the signal comprising digital data and a set of training sequence bits modulated prior to transmission;
   generating a set of reference signal samples representing the training sequence bits and a set of rotation elements depending on the modulation applied to the digital data prior to transmission;
   sampling the signal to produce a plurality of received signal samples from the training sequence portion of the signal, the received signal samples possibly including a DC offset; and
   manipulating the received signal samples with the sets of received signal samples and rotation elements in such a way as to simultaneously estimate the DC offset ($a_{dc}$) and the channel impulse response (h) by minimizing a squared distance function,
   wherein the channel impulse response (h) is estimated using a priori information which is either pre-stored or calculated in a preliminary estimation.

2. The method of claim 1 wherein the squared distance function is $F=|y-X.h-e.a_{dc}|^2$, where y represents the received signal samples, X represents the training sequence samples and e represents the set of rotation elements.

3. A method according to claim 1, further comprising arranging the set of reference signal samples representing the training sequence bits and the set of rotation elements depending on the modulation applied to the digital data prior to transmission as an extended training sequence matrix;
   wherein the manipulation results in an extended channel impulse vector which comprises an estimate of the DC offset ($a_{dc}$) and a plurality of the channel impulse response elements (h).

4. A method according to claim 3, wherein the manipulation carried out with the extended reference matrix and the received signal samples to generate the extended channel impulse vector $h_e$ is as follows:

$$h_e = (X_e^H X_e)^{-1} X_e^H y$$

where $h_e$ represents the extended channel impulse vector, $X_e$ represents the extended reference matrix, y represents the received signal samples and $X_e^H$ represents the complex conjugate transpose of the extended reference matrix.

5. A method according to claim 3, further comprising:
   extracting the channel impulse elements from the extended channel impulse vector and using the channel impulse elements in an equalization to remove from the received signal samples the effects of the communication channel for the signal.

6. A method according to claim 1 wherein the signal comprises a transmission burst in a time division multiple access mobile communication system.

7. A method according to claim 1, wherein the received signal is sampled at the expected transmitted bit rate of the signal to produce a number of received signal samples corresponding to the number of bits of digital data and training sequence bits.

8. A method according to claim 1, further comprising arranging the set of reference signal samples representing the training sequence bits and the set of rotation elements depending on the modulation applied to the digital data prior to transmission as an extended training sequence matrix;
   wherein the manipulation results in an extended channel impulse vector which comprises an estimate of the DC offset ($a_{dc}$) and a plurality of the channel impulse response elements (h), the manipulation carried out with the extended reference matrix and the received signal samples to generate the extended channel impulse vector $h_e$ being as follows:

$$h_e = (\delta^2 C_{hh}^{-1} + X_e^H X_e)^{-1} X_e^H y, \text{ where}$$

$$C_{hh}^{-1} = \begin{pmatrix} 1/h_0^* h_0 & 0 & \ldots & \ldots & 0 \\ 0 & 1/h_1^* h_1 & 0 & \ldots & 0 \\ \ldots & \ldots & \ldots & \ldots & \ldots \\ \ldots & \ldots & \ldots & 1/h_i^* h_i & \ldots \\ 0 & 0 & \ldots & \ldots & 1/dc^* dc \end{pmatrix}$$

and where $h_e$ represents the extended channel impulse vector, $X_e$ represents the extended reference matrix, y represents the received signal samples and $X_e^H$ represents the complex conjugate transpose of the extended reference matrix.

9. The method of claim 1 wherein the a priori information is generated in a preliminary estimation.

10. The method of claim 1 wherein the a priori information is pre-stored.

11. The method of claim 1, wherein the squared distance function is a linear minimum mean squared error function.

12. The method of claim 11 wherein the squared distance function is $F = |y-X.h-e.a_{dc}|^2$.

13. A method of correcting for a DC offset, the method comprising:
receiving a signal from a first station by a second station via a communication channel in a mobile communication system, the signal comprising digital data and a set of training sequence bits modulated prior to transmission;
sampling the signal to produce a plurality of received signal samples from the training sequence portion of the signal, the received signal samples possibly including a DC offset;
manipulating the received signal samples with a set of reference signal samples representing the training sequence bits and a set of rotation elements depending on the modulation applied to the digital data prior to transmission to simultaneously estimate the DC offset ($a_{dc}$) and the channel impulse response (h) by minimizing a squared distance function; and
correcting the set of received signal samples in the digital data portion of the signal by removing the thus estimated DC offset from the received signal samples,
wherein the channel impulse response (h) is estimated using a priori information which is either pre-stored or calculated in a preliminary estimation.

14. The method of claim 13 wherein the squared distance function is $F=|y-X.h-e.a_{dc}|^2$, where y represents the received signal samples, X represents the training sequence samples and e represents the set of rotation elements.

15. A system for simultaneously determining a DC offset and a channel impulse response, the system comprising:
circuitry configured to receive a signal from a first station by a second station via a communication channel in a mobile communication system, the signal comprising digital data and a set of training sequence bits modulated prior to transmission;
circuitry configured to sample the signal to produce a plurality of received signal samples from the training sequence portion of the signal, the received signal samples possibly including a DC offset;
a memory configured to hold a set of reference signal samples representing the training sequence bits and a set of rotation elements depending on the modulation applied to the digital data prior to transmission;
an extended channel impulse response calculation unit configured to manipulate the received signal samples with the reference signal samples and the set of rotation elements in such a way as to simultaneously estimate the DC offset ($a_{dc}$) and the channel impulse response (h) by minimising a squared distance function;
circuitry configured to extract the DC offset from the simultaneous estimate performed by the extended channel impulse response calculation unit; and
circuitry configured to provide a priori information to the extended channel impulse response calculation unit, the a priori information being either pre-stored or calculated in a preliminary estimation.

16. A system according to claim 15 wherein the squared distance function is $F=|y-X.h-e.a_{dc}|^2$, where y represents the received signal samples, X represents the training sequence samples and e represents the set of rotation elements.

17. A system according to claim 16, further comprising: removing circuitry configured to remove the DC offset ($a_{dc}$) from received signal samples representing the digital data portion of the signal.

18. A system according to claim 16, further comprising: combining circuitry configured to combine the extracted DC offset ($a_{dc}$) with the set of rotation elements prior to removal of the DC offset ($a_{dc}$) from the received signal samples representing the digital data portion of the signal.

19. A system according to claim 15, further comprising an equalization circuit operable to remove from the received signal the effects of the communication channel for the signal using the channel impulse elements extracted from the simultaneous estimate performed by the extended channel impulse response calculation unit.

20. The system of claim 15 wherein said circuitry configured to provide a priori information comprises an impulse response estimation block.

21. The system of claim 15 wherein said circuitry configured to provide a priori information comprises a memory storing said a priori information.

22. The system of claim 15, wherein the extended channel impulse response calculation unit is a linear minimum mean squared error calculation unit.

23. The system of claim 22 wherein the extended channel impulse response is:

$$h_e = (\delta^2 C_{hh}^{-1} + X_e^H X_e)^{-1} X_e^H y, \text{ where}$$

$$C_{hh}^{-1} = \begin{pmatrix} 1/h_0^* h_0 & 0 & \ldots & \ldots & 0 \\ 0 & 1/h_1^* h_1 & 0 & \ldots & 0 \\ \ldots & \ldots & \ldots & \ldots & \ldots \\ \ldots & \ldots & \ldots & 1/h_i^* h_i & \ldots \\ 0 & 0 & \ldots & \ldots & 1/dc^* dc \end{pmatrix}$$

and where $h_e$ represents the extended channel impulse vector, $X_e$ represents the extended reference matrix, y represents the received signal samples and $X_e^H$ represents the complex conjugate transpose of the extended reference matrix.

24. The system of claim 15 wherein the squared distance function is $F=|y-X.h-e.a_{dc}|^2$, where y represents the received signal samples, X represents the training sequence samples and e represents the set of rotation elements.

25. A method of determining a DC offset, the method comprising:
receiving a signal from a first station by a second station via a communication channel in a mobile communication system, the signal comprising digital data and a set of training sequence bits modulated prior to transmission;
generating an extended reference matrix having m+1 columns where m columns contain reference signal samples representing the training sequence bits and the m+1 column contains a set of rotation elements depending on the modulation applied to the digital data prior to transmission;
sampling the signal to produce a plurality of received signal samples from the training sequence portion of the signal, the received signal samples possibly including a DC offset; and
manipulating the received signal samples with the extended reference matrix to produce an extended channel impulse vector comprising m channel impulse elements representing the communication channel and a further element representing the DC offsets,
wherein the channel impulse response vector is produced using a priori information which is either pre-stored or calculated in a preliminary estimation.

26. A method of correcting for a DC offset in a signal received from a first station by a second station via a communication channel in a mobile communication system, the signal comprising digital data and a set of training sequence bits modulated prior to transmission, the method comprising:

receiving and sampling the signal to produce a plurality of received signal samples from the training sequence portion of the signal, the received signal samples possibly including a DC offset;

manipulating the received signal samples with an extended reference matrix having m+1 columns where m columns contain reference signal samples representing the training sequence bits and the m+1 column contains a set of rotation element depending on the modulation applied to the digital data prior to transmission to produce an extended channel impulse vector comprising m channel impulse elements representing the communication channel and a further element representing the DC offset;

extracting a DC offset from the extended channel impulse vector; and correcting the set of received signal samples in the digital data portion of the signal by removing the thus determined DC offsets, wherein the channel impulse response vector is produced using a priori information which is either pre-stored or calculated in a preliminary estimation.

27. A system for simultaneously determining a DC offset and a channel impulse response, the system comprising:

circuitry means for receiving a signal from a first station by a second station via a communication channel in a mobile communication system, the signal comprising digital data and a set of training sequence bits modulated prior to transmission;

circuitry means for sampling the signal to produce a plurality of received signal samples from the training sequence portion of the signal, the received signal samples possibly including a DC offset;

memory means for holding a set of reference signal samples representing the training sequence bits and a set of rotation elements depending on the modulation applied to the digital data prior to transmission;

extended channel impulse response calculation means for manipulating the received signal samples with the reference signal samples and the set of rotation elements in such a way as to simultaneously estimate the DC offset ($a_{dc}$) and the channel impulse response (h) by minimizing a squared distance function;

circuitry means for extracting the DC offset from the simultaneous estimate performed by the extended channel impulse response calculation means; and circuitry means for providing a priori information to the extended channel impulse response calculation means, the a priori information being either pre-stored or calculated in a preliminary estimation.

* * * * *